US012804736B2

(12) United States Patent
Lu et al.

(10) Patent No.: US 12,804,736 B2
(45) Date of Patent: Nov. 17, 2026

(54) VALIDITY INFORMATION OF NETWORK SLICE BASED COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Fei Lu, Dongguan (CN); Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 249 days.

(21) Appl. No.: 18/670,182

(22) Filed: May 21, 2024

(65) Prior Publication Data

US 2024/0314857 A1 Sep. 19, 2024

Related U.S. Application Data

(63) Continuation of application No. PCT/CN2021/132155, filed on Nov. 22, 2021.

(51) Int. Cl.

*H04W 48/18* (2009.01)
*H04W 60/04* (2009.01)
*H04W 64/00* (2009.01)
*H04W 76/10* (2018.01)

(52) U.S. Cl.

CPC ........... *H04W 76/10* (2018.02); *H04W 48/18* (2013.01); *H04W 60/04* (2013.01); *H04W 64/00* (2013.01)

(58) Field of Classification Search

CPC ..... H04W 76/10; H04W 48/18; H04W 60/04; H04W 64/00; H04W 60/00; H04W 76/12; H04W 72/12

See application file for complete search history.

(56) References Cited

U.S. PATENT DOCUMENTS

| | | | | |
|---|---|---|---|---|
| 2021/0084568 | A1* | 3/2021 | Liu | H04W 48/08 |
| 2021/0227392 | A1* | 7/2021 | Zhu | H04W 12/082 |
| 2023/0308363 | A1* | 9/2023 | Ishii | H04W 48/18 |

FOREIGN PATENT DOCUMENTS

| | | | |
|---|---|---|---|
| CN | 109314917 | A | 2/2019 |
| CN | 111885698 | A | 11/2020 |
| CN | 113079564 | A | 7/2021 |
| CN | 113329516 | A | 8/2021 |

(Continued)

OTHER PUBLICATIONS

ZTE et al., "Study on Enhancement of Network Slicing Phase 3" SA WG2 Meeting #S2-147E, S2-2107281, dated Oct. 18-22, 2021. 7 pages.

(Continued)

*Primary Examiner* — Lakeram Jangbahadur
(74) *Attorney, Agent, or Firm* — Sheppard, Mullin, Richter & Hampton LLP

(57) ABSTRACT

A communication method, a terminal device, and a network device are provided. The method is applicable to a terminal device and includes the following. The terminal device receives validity information of a network slice from a network device, where the validity information indicates whether the network slice is available for a PDU session establishment request or a PDU session modification request.

13 Claims, 7 Drawing Sheets

(56) References Cited

FOREIGN PATENT DOCUMENTS

| | | | | | |
|---|---|---|---|---|---|
| CN | 113543248 | A | | 10/2021 | |
| WO | WO-2019196090 | A1 | * | 10/2019 | ............ H04W 72/12 |

OTHER PUBLICATIONS

Samsung, "Update UE-requested PDU session establishment procedure regarding S-NSSAI" 3GPP TSG-CT WG1 Meeting #108, C1-180369, dated Jan. 22-26, 2018. 4 pages.

WIPO, International Search Report and Written Opinion for International Application No. PCT/CN2021132155, Aug. 16, 2022. 15 pages(with English translation).

* cited by examiner

VALIDITY INFORMATION OF NETWORK SLICE BASED COMMUNICATION METHOD, TERMINAL DEVICE, AND NETWORK DEVICE

CROSS REFERENCE TO RELATED APPLICATION(S)

This application is a continuation of International Application No. PCT/CN2021/132155, filed Nov. 22, 2021, the entire disclosure of which is incorporated herein by reference.

TECHNICAL FIELD

This disclosure relates to the field of communication, and in particularly to a communication method, a terminal device, and a network device.

BACKGROUND

With the continuous emergence of a variety of communication services, different communication services have significantly different requirements for network performance. A concept of network slice (NS) is introduced in a fifth generation (5G) mobile communication system to cope with the different requirements of different communication services for network performance.

Currently, when a terminal device needs to use a network slice, the terminal device needs to first request use of a slice from a network, and then the network can determine allowed network slice selection assistance information (NSSAI) within the scope of the subscription of the terminal device and the deployment of network slices according to request information transmitted by the terminal device, where the allowed NSSAI includes a single NSSAI (S-NSSAI) for at least one network slice. After that, the terminal device can transmit data in at least one allowed network slice.

However, network slices corresponding to the allowed NSSAI may include a temporarily deployed network slice, and the temporarily deployed network slice is valid only under certain conditions. When the terminal device fails in requesting to establish a packet data unit (PDU) session with the temporarily deployed network slice, the terminal device may try repeatedly, resulting in larger signaling consumption.

SUMMARY

In a first aspect, a communication method is provided in embodiments of the present disclosure. The method is applicable to a terminal device and includes the following. Validity information of a network slice is received from a network device, where the validity information indicates whether the network slice is available for a PDU session establishment request or a PDU session modification request.

In a second aspect, a terminal device is provided in embodiments of the present disclosure. The terminal device includes a transceiver, a memory configured to store computer programs, and a processor configured to execute the computer programs to cause the transceiver to: receive validity information of a network slice from a network device, where the validity information indicates whether the network slice is available for a PDU session establishment request or a PDU session modification request.

In a third aspect, a network device is provided in embodiments of the present disclosure. The network device includes a transceiver, a memory configured to store computer programs, and a processor configured to execute the computer programs to cause the transceiver to: transmit validity information of a network slice to a terminal device, where the validity information indicates whether the network slice is available for a PDU session establishment request or a PDU session modification request.

DETAILED DESCRIPTION

In order to better understand technical solutions of the present disclosure, related concepts and technologies involved in the present disclosure will be elaborated below.

Network slicing: network slicing is an on-demand networking method that can separate multiple virtual end-to-end networks from a unified infrastructure. Each network slice is logically isolated on a radio access network (RAN), a bearer network, and a core network (CN), to adapt to various types of applications. The network slice can be divided into at least three parts: a RAN sub-slice, a bearer network sub-slice, and a core network sub-slice.

S-NSSAI: single network slice selection assistance information (S-NSSAI) is used for identifying a network slice. The S-NSSAI includes two parts: a slice/service type (SST) and a slice differentiator (SD). The SST refers to expected attributes in terms of features and services for the network slice, and some standardized SST values have been defined, for example, 1 for enhanced mobile broadband (eMBB), 2 for ultra-reliable and low-latency communication (ULLC), 3 for massive internet of things (MIoT), and 4 for vehicle to everything (V2X). The SD is optional information that is used for complementing the SST to differentiate multiple network slices of a same SST. The SD can be used for identifying a service provider of a specific service to be performed by a user.

NSSAI: network slice selection assistance information (NSSAI) is a set of the S-NSSAIs. The NSSAI used in a fifth generation (5G) network may include a requested NSSAI, an allowed NSSAI, a configured NSSAI, a subscribed NSSAI, and a rejected NSSAI.

Requested NSSAI: NSSAI that a user equipment (UE) expects to use and that the UE provides to a network side in a registration process.

Allowed NSSAI: NSSAI that is provided by a public land mobile network (PLMN) to the UE in a process such as registration and indicates a set of S-NSSAI values that the UE can use in a current registration area. The allowed NSSAI is locally stored by the UE.

Configured NSSAI: NSSAI configured on the UE by a network for the UE to use.

Subscribed NSSAI: NSSAI in user subscription data in a unified data management (UDM) function.

Rejected NSSAI: NSSAI that is transmitted by the network and is not allowed to be accessed by the user.

GUTI: globally unique temporary UE identity.

A communication system to which embodiments of the present disclosure are applicable will be described below.

Figure 1:
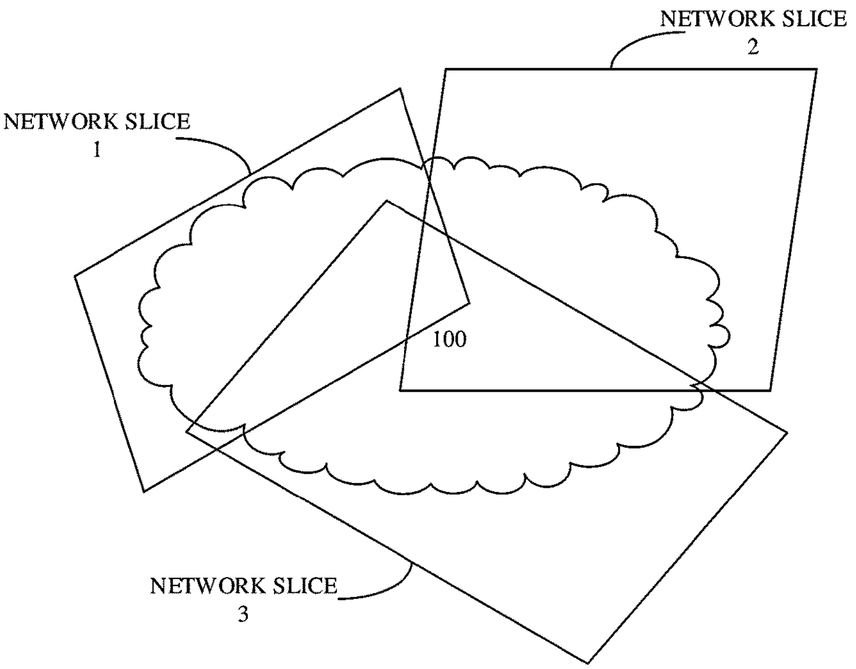
FIG. 1 is a schematic diagram of a communication system provided in embodiments of the present disclosure.

Embodiments of the present disclosure are applicable to a wireless communication system including multiple network slices. The communication system of the present disclosure is illustrated in conjunction with FIG. 1. FIG. 1 is a schematic diagram of a communication system provided in embodiments of the present disclosure.

Schematically, reference can be made to the schematic diagram of the communication system 100 illustrated in FIG. 1. As illustrated in FIG. 1, the wireless network communication system 100 is logically divided into multiple network slices in an abstract manner. FIG. 1 illustrates three network slices: network slice 1, network slice 2, and network slice 3. It may be understood that the network slices are obtained through logical division, and thus there may be overlapping areas among multiple network slices. For example, there are overlapping areas among the three network slices illustrated in FIG. 1.

Any of the three network slices in FIG. 1 can constitute an end-to-end logical network, and different network slices are logically isolated from each other. Each network slice can provide one or more network services for a terminal device, and network services provided by different network slices do not interfere with or affect each other. In general, network features and performance requirements for different network slices are different.

Figure 2:
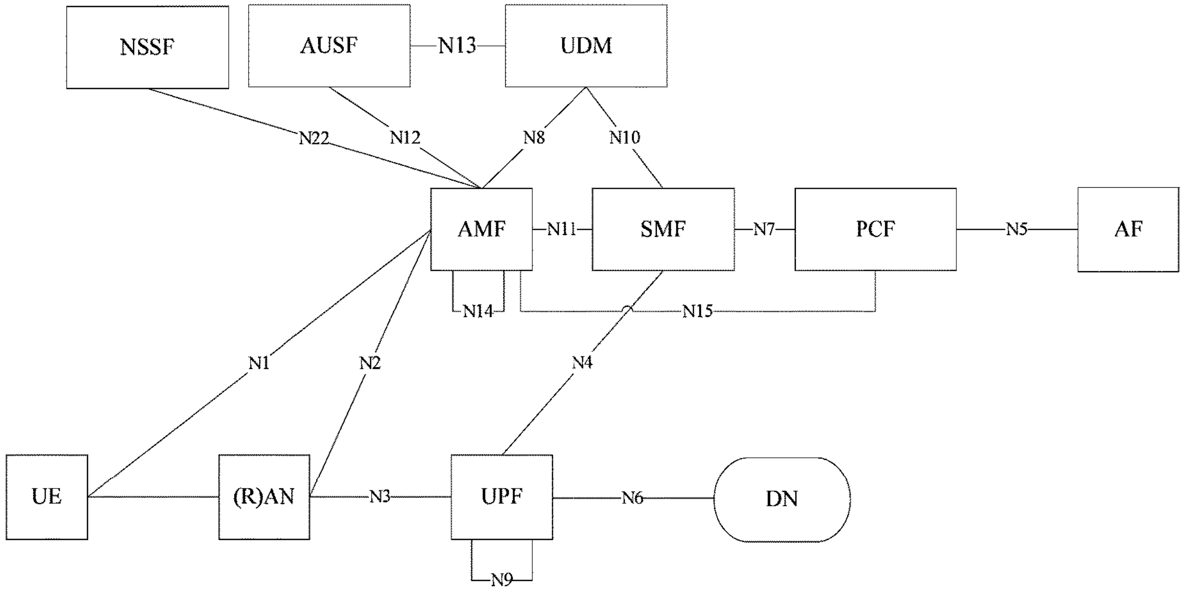
FIG. 2 is a schematic diagram of an architecture of a communication system provided in embodiments of the present disclosure.

An architecture of the communication system in the present disclosure is described below in conjunction with FIG. 2. FIG. 2 is a schematic diagram of an architecture of a communication system provided in embodiments of the present disclosure. Schematically, FIG. 2 illustrates only network slice 1.

As illustrated in FIG. 2, the communication system may include a UE, a (radio) access network ((R)AN) device, an access and mobility management function (AMF) network element, a session management function (SMF) network element, a user plane function (UPF) network element, an authentication server function (AUSF) network element, a policy control function (PCF) network element, an application function (AF) network element, a unified data management (UDM) network element, a network slice selection function (NSSF) network element, and a data network (DN) network element connecting to an operator's network, or other functional units.

Among these network elements, the NSSF network element, the DN network element, the UDM network element, and the AMF network element may be shared among multiple network slices. The SMF network element may generally belong to a specific network slice. The PCF network element may be shared among multiple network slices or may belong to a specific network slice. The (R)AN device may be generally shared among multiple network slices.

As illustrated in FIG. 2, the functional units mentioned above can communicate with each other through a next-generation (NG) interface. Examples are listed as follows. The UE can transmit a control plane message with the AMF network element through NG interface 1 (N1 for short). The RAN device can establish a user plane data transmission channel with the UPF through NG interface 3 (N3 for short). The AN/RAN device can establish a control plane signaling connection with the AMF network element through NG interface 2 (N2 for short). The UPF can exchange information with the SMF network element through NG interface 4 (N4 for short). The UPF can exchange user plane data with the DN through NG interface 6 (N6 for short). The AMF network element can exchange information with the SMF network element through NG interface 11 (N11 for short). The SMF network element can exchange information with the PCF network element through NG interface 7 (N7 for short). The AMF network element can exchange information with the AUSF through NG interface 12 (N12 for short). It may be noted that FIG. 2 is only an exemplary architectural diagram, and the network architecture may further include another functional unit in addition to the functional units illustrated in FIG. 2.

The network elements illustrated in FIG. 2 are specified below.

The UE, which can also be referred to as a terminal device, a mobile station, a remote station, etc., is a communication device with a wireless transceiver function. The terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.). In embodiments of the present disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self-driving, a wireless terminal device in remote medicine, a wireless terminal device in smart grid, a wireless terminal device in transportation safety, a wireless terminal device in smart city, a wireless terminal device in smart home, etc., which are not exhaustive. Specific technologies, device forms, and names used by the terminal device will not be limited in embodiments of the present disclosure.

The (R)AN device can be used for wireless side access of the terminal device and can provide access services for the terminal device to access a wireless network. An access network device can be deployed in a separated scenario of a centralized unit (CU) and a distributed unit (DU), and a single-site scenario.

In the separated scenario, the CU supports radio resource control (RRC), a packet data convergence protocol (PDCP), a service data adaptation protocol (SDAP), and other protocols. The DU mainly supports radio link control (RLC), media access control (MAC), and a physical layer protocol. The DU mainly supports radio link control (RLC), media access control (MAC), and physical (PHY) protocols.

In the single-site scenario, a single site may include one or more of a new radio Node (gNB), an evolved Node B (eNB), a radio network controller (RNC), a Node B (NB), a base station controller (BSC), a base transceiver station (BTS), a home base station, or a base band unit (BBU).

In an actual communication scenario, there may be one or more (usually multiple) gNBs in the entire service area of the network slice. Each gNB has a certain coverage area in which there may be one or more cells, and each cell has a unique global cell identifier (GCI).

The AMF network element is mainly used for a mobility management process of the terminal device in a mobile network. An access management network element can terminate a non-access stratum (NAS) message, complete registration management, connection management, reachability management, tracking area (TA) list allocation, mobility management, etc., and transparently route a session management (SM) message to an SM network element.

The SMF network element is mainly used for session management in the mobile network, such as session establishment, modification, and release. Specific functions of the SMF network element include allocating an internet protocol (IP) address to the terminal device, selecting a user plane network element that provides a message forwarding function, etc.

The UPF network element can also be referred to as a protocol data unit (PDU) or a PDU session anchor (PSA), and is mainly responsible for processing, such as forwarding, charging, or legally listening, a user message.

The PCF network element has a user subscription data management function, a policy control function, a charging policy control function, quality of service (QOS) control, etc.

It may be noted that in an actual communication network, the PCF can also be divided into multiple entities by level or by function. For example, in the communication system, the PCF can include a global PCF and PCFs in multiple slices. The PCF in each slice is used for implementing the policy control function in the network slice to which the PCF belongs. As another example, the PCF can also include a session management PCF (SM-PCF) and an access management PCF (AM-PCF) in function division. In this case, the PCF includes two entities.

The NSSF network element is mainly used for selecting an appropriate network slice for services of the terminal device. In a 5G communication system, a network slice selection network element can be the NSSF network element.

The DN network element is used for providing data transmission services for the terminal device. Specifically, the DN may be a network element of a public data network (PDN) such as the internet, etc., or may be a network element of a local access data network (LADN) such as a network of a mobile edge computing (MEC) node, etc.

The UDM network element is used for managing subscription information of the terminal device.

The AUSF network element is responsible for an authentication function and the like for the terminal device.

It may be noted that the functional units described above may work independently or may be combined together to implement some control functions, for example, access control and mobility management functions such as access authentication, security encryption, and location registration of the terminal device, and session management functions such as establishment, release, and modification of a user plane transmission path.

According to the network architecture described above, when the UE needs to use the network slice, the UE needs to first request use of the network slice from the network. After the network agrees, the UE can establish a PDU session in a requested network slice to transmit data. An implementation of the UE requesting the network slice in the registration process in the present disclosure will be described below in connection with FIG. 3.

Figure 3:
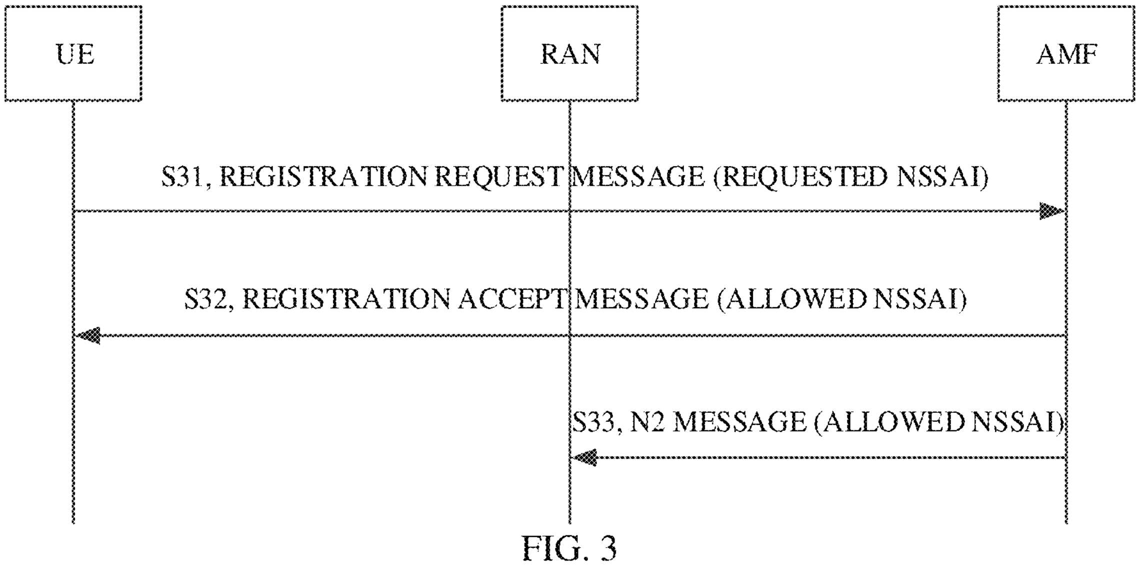
FIG. 3 is a diagram of signaling interaction of a user equipment (UE) registration process provided in embodiments of the present disclosure.

FIG. 3 is a diagram of signaling interaction of a UE registration process provided in embodiments of the present disclosure. As illustrated in FIG. 3, the UE registration process includes the following.

At S31, a UE transmits a registration request message to an AMF network element.

The UE can transmit the registration request message to the AMF network element, and the registration request message can contain an S-NSSAI that the UE needs to request.

When the UE works, wireless transmission requirements of various types of service data may be involved. The service data may have different requirements for wireless network performance. Generally, different service data need to be transmitted using different network slices.

Specifically, 3GPP defines that a terminal device and a network device use an NSSAI to select a network slice. Therefore, the NSSAI can be used for identifying a group of network slices. In this case, the group of network slices can include one or more network slices, and a single network slice can be identified by the S-NSSAI, where one S-NSSAI can be used for identifying one network slice.

Therefore, in the present disclosure, the UE can determine the S-NSSAI that the UE needs to request according to services needed. When the UE transmits a registration request to the AMF network element, the registration request can include a requested NSSAI, and the requested NSSAI can include the S-NSSAI that the UE needs to request.

At S32, the AMF network element transmits an allowed NSSAI to the UE.

The AMF network element can determine, according to the scope of the subscription of the UE and the deployment of network slices, an identifier of a network slice that can be accessed by the terminal device at a current location, that is, an identifier of a network slice that is allowed by a network to be accessed. The identifier of the network slice that is allowed by the network to be accessed can be referred to as the allowed NSSAI. In other words, the NSSAI is a set of identifiers of one or more network slices that can be used simultaneously by the terminal device at the current location through an AN and an AMF network element currently registered. The allowed NSSAI can be determined.

In addition, the AMF network element may transmit a registration accept message containing the determined allowed NSSAI to the UE.

At S33, the AMF network element transmits the allowed NSSAI to a RAN device.

In addition, in the present disclosure, the AMF network element may alternatively transmit an N2 message containing the allowed NSSAI to the RAN device.

The AMF network element may transmit the allowed NSSAI to the UE and the RAN device sequentially or simultaneously, which will not be limited in the present disclosure.

After the UE receives the allowed NSSAI, the UE can establish a PDU session in a network slice in the allowed NSSAI. After the PDU session is established, the UE can transmit and receive data.

In slice support of R17, a supported slice is fixed and long-term, whereas in requirements of slice support of R18, temporary deployment of the network slice is introduced. For example, the network slice may have a limited lifetime or a time of day lifetime.

For the above scenario, according to a current mechanism, an allowed NSSAI allocated to the terminal device by the network device is valid in a current registration area. As for a temporarily deployed network slice, the terminal device is unable to know under what circumstances the temporarily deployed network slice is valid and under what circumstances the temporarily deployed network slice is invalid. If the terminal device considers all allowed NSSAIs allocated to be valid, the terminal device can request to establish the PDU session for network slices in the allowed NSSAIs. If the network slices are no longer available, the terminal device may repeatedly try to re-establish the PDU session after the request to establish the PDU session fails, which will waste signaling and affect user experience.

According to the above technical problem, the present disclosure proposes a technical idea as follows. As for the temporarily deployed network slice, the network device synchronizes validity information of the temporarily deployed network slice to the terminal device, thus avoiding repeated tries caused by failure of the request by the terminal device to establish the PDU session with an unavailable network slice.

Figure 4:
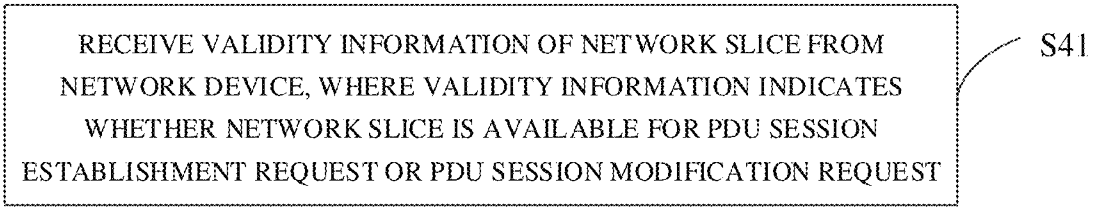
FIG. 4 is a schematic flowchart of a communication method provided in embodiments of the present disclosure.

FIG. 4 is a schematic flowchart of a communication method provided in embodiments of the present disclosure. As illustrated in FIG. 4, the communication method includes the following.

At S41, a terminal device receives validity information of a network slice from a network device, where the validity information indicates whether the network slice is available for a PDU session establishment request or a PDU session modification request.

The validity information of the network slice indicates validity of the network slice. The validity information may indicate under what circumstances a corresponding network slice is valid or available, or may indicate under what circumstances the corresponding network slice is invalid or unavailable. For example, as for a temporarily deployed network slice, the validity information may indicate when the network slice is valid or available, may indicate in which area the network slice is valid or available, etc.

After obtaining the validity information, the terminal device may determine whether the corresponding network slice is valid or available or the corresponding network slice is invalid or unavailable according to the validity information. Further, the terminal device may determine whether the network slice is available for the PDU session establishment request or the PDU session modification request according to the validity information. If the network slice is available for the PDU session establishment request or the PDU session modification request, the terminal device may initiate the PDU session establishment request or the PDU session modification request for the network slice. If the network slice is unavailable for the PDU session establishment request or the PDU session modification request, the terminal device may not initiate the PDU session establishment request or the PDU session modification request for the network slice. For example, when the terminal device is in a valid area of the network slice or a current moment is in a valid time period of the network slice, the terminal device may initiate a request to establish a PDU session with the network slice. When the terminal device is not in the valid area of the network slice or the current moment is not in the valid time period of the network slice, the terminal device may not initiate the request to establish the PDU session with the network slice.

According to the communication method provided in embodiments of the present disclosure, the terminal device receives the validity information of the network slice from the network device, where the validity information indicates whether the network slice is available for the PDU session establishment request or the PDU session modification request. Since the network device synchronizes the validity information of the network slice to the terminal device, the terminal device can know whether the network slice is valid or available currently according to the validity information. Therefore, the terminal device can determine whether to initiate the PDU session establishment request or the PDU session modification request for the network slice according to the validity information, thus reducing invalid tries by the terminal device and saving signaling consumption of the terminal device.

In a communication system provided in embodiments of the present disclosure, on the one hand, one network slice can cover one or more TAs and provide services, and on the other hand, one TA can support one or more network slices. The TA may be identified by a tracking area identifier (TAI) or a tracking area code (TAC).

During network deployment, each network slice corresponds to a respective coverage area, and respective coverage areas of network slices may be different. When determining an allowed NSSAI, an AMF network element needs to ensure that all network slices in the allowed NSSAI can cover a registration area allocated to a UE by the AMF network element, where the registration area can be construed as a TA list.

In a possible implementation, the AMF network element can obtain an S-NSSAI supported by a base station and a TA corresponding to the S-NSSA from the base station through an NG setup request or a RAN device configuration update signaling.

The terminal device receives the validity information of the network slice from the network device, and then determines whether to transmit the PDU session establishment request and/or the PDU session modification request for the network slice according to the validity information, where the validity information of the network slice may contain location information and/or time information.

The location information indicates a valid area and/or an invalid area of the corresponding network slice in a registration area of the terminal device. The location information may contain location validity information indicating the valid area of the network slice and/or location invalidity information indicating the invalid area of the network slice.

The location information may be a cell identifier and/or a TAI. For example, the location validity information contains a first cell identifier, representing that the corresponding network slice is valid or available in a coverage area of a first cell. For example, the location validity information contains a first TAI, representing that the corresponding network slice is valid or available in an area of the first TAI. For example, the location validity information contains the first cell identifier and the first TAI, representing that the corresponding network slice is valid or available in the coverage area of the first cell and the area of the first TAI. The first cell identifier can include one or more cell identifiers, and the first TAI can include one or more TAIs.

For example, the location invalidity information contains a second cell identifier, representing that the corresponding network slice is invalid or unavailable in a coverage area of a second cell. For example, the location invalidity information contains a second TAI, representing that the corresponding network slice is invalid or unavailable in an area of the second TAI. For example, the location invalidity information contains the second cell identifier and the second TAI, representing that the corresponding network slice is invalid or unavailable in the coverage area of the second cell and the area of the second TAI. The second cell identifier can include one or more cell identifiers, and the second TAI can include one or more TAIs.

The time information indicates a valid time period and/or an invalid time period of the network slice. The time information contains time validity information indicating the valid time period of the network slice and/or time invalidity information indicating the invalid time period of the network slice.

The time information may contain at least one of a start time, a duration, or a stop time. For example, the time validity information contains a first start time, representing that the corresponding network slice is valid or available from the first start time. For example, the time validity information contains a first duration, representing that the corresponding network slice is valid or available within the first duration. This is equivalent to setting a validity timer for the network slice. In this case, the network slice is valid or available during the running of the validity timer, and is invalid or unavailable during another time period. The validity timer may start, for example, at a moment when the terminal device receives a registration accept message, or at the first start time (if both the first start time and the first duration are contained in the time validity information). For example, the time validity information contains a first stop time, representing that the corresponding network slice is valid or available before the first stop time, and is invalid or unavailable after the first stop time. For example, the time validity information contains the first start time and the first stop time, representing that the corresponding network slice is valid or available during a time period between the first start time and the first stop time, and is invalid or unavailable during another time period.

For example, the time invalidity information contains a second start time, representing that the corresponding network slice is invalid or unavailable from the second start time. For example, the time invalidity information contains a second duration, representing that the corresponding network slice is invalid or unavailable within the second duration. This is equivalent to setting an invalidity timer for the network slice. In this case, the network slice is invalid or unavailable during the running of the invalidity timer, and is valid or available during another time period. The invalidity timer may start, for example, at the moment when the terminal device receives the registration accept message, or at the second start time (if both the second start time and the second duration are contained in the time invalidity information). For example, the time invalidity information contains a second stop time, representing that the corresponding network slice is invalid or unavailable before the second stop time, and is valid or available after the second stop time. For example, the time invalidity information contains the second start time and the second stop time, representing that the corresponding network slice is invalid or unavailable during a time period between the second start time and the second stop time, and is valid or available during another time period.

After obtaining the validity information of the network slice, the terminal device may determine whether to transmit the PDU session establishment request and/or the PDU session modification request for the network slice according to the validity information. Specifically, the terminal device determines whether the network slice is available for the PDU session establishment request or the PDU session modification request according to the location information and/or time information in the validity information. In a case where the network slice is available for the PDU session establishment request or the PDU session modification request, the terminal device can initiate the PDU session establishment request or the PDU session modification request for the network slice. In a case where the network slice is unavailable for the PDU session establishment request or the PDU session modification request, the terminal device can skip initiating the PDU session establishment request or the PDU session modification request for the network slice.

For example, when the terminal device determines that the network slice is valid or available according to the location information and/or the time information, if the terminal device has not yet established the PDU session with the network slice, the network slice is available for PDU session establishment, and the terminal device can request from the network slice to establish the PDU session, i.e., the terminal device can transmit the PDU session establishment request to the network slice, and if the terminal device has established the PDU session with the network slice, the network slice is unavailable for the PDU session establishment, and the terminal device can not initiate the PDU session establishment request for the network slice.

For example, when the terminal device determines that the network slice is invalid or unavailable according to the location information and/or the time information, if the terminal device has initiated a request to establish the PDU session with the network slice, the network slice is available for PDU session modification, and the terminal device can stop requesting from the network slice to establish the PDU session, and if the terminal device has not initiated the request to establish the PDU session with the network slice, the network slice is unavailable for the PDU session modification.

In embodiments of the present disclosure, the validity information can be carried in a first message, and the network device transmits the first message to the terminal device. The terminal device obtains the validity information after receiving the first message from the network device, where the first message is a registration response message for a registration request message transmitted by the terminal device or a terminal configuration update message.

Optionally, when the validity information is carried in the first message, the network device may be a core network device, and the core network device may include an AMF network element.

When the validity information is carried in the first message, the first message carries an NSSAI. The NSSAI can include, in addition to an S-NSSAI, validity information of at least one network slice, and the validity information may indicate under what circumstances the corresponding network slice is valid or available or may indicate under what circumstances the corresponding network slice is invalid or unavailable. For example, as for a temporarily deployed network slice, the validity information may indicate when the network slice is valid or available, may indicate in which area the network slice is valid or available, etc.

The NSSAI can include one or more S-NSSAIs, and the validity information is validity information of some or all of network slices identified by the one or more S-NSSAIs. For example, three network slices, namely, network slice 1, network slice 2, and network slice 3 are included. The validity information may be validity information of network slice 1, validity information of network slice 2, and validity information of network slice 3, or the validity information may contain only the validity information of network slice 1.

In an implementation, the NSSAI may include an allowed NSSAI and/or a rejected NSSAI. When the NSSAI includes the allowed NSSAI, the allowed NSSAI contains the location information and/or the time information. When the NSSAI includes the rejected NSSAI, the rejected NSSAI contains the location information and/or the time information. Optionally, the rejected NSSAI further contains a rejection cause, where the rejection cause is used for notifying a network slice supported in a partial area and/or a temporary area.

In an implementation, the NSSAI includes the allowed NSSAI and/or the rejected NSSAI. The validity information is carried in the allowed NSSAI. The rejected NSSAI contains the rejection cause, and the rejection cause is used for notifying the network slice supported in the partial area and/or the temporary area.

The rejection cause indicates a reason why the corresponding network slice is unavailable. When the NSSAI is the rejected NSSAI, the rejected NSSAI is an NSSAI that is configured by the network and is not allowed to be accessed by the user. The rejected NSSAI can contain the rejection cause, and the rejection cause may be, for example, that the corresponding network slice is a temporarily deployed network slice. The temporarily deployed network slice may represent that the network slice is valid or available only during a certain time period and is invalid or unavailable during another time period (e.g., the current moment is in an invalid or unavailable time period of the network slice or the invalid or unavailable time period of the network slice is coming soon). The temporarily deployed network slice may also represent that the network slice is valid or available only in a partial area and is invalid or unavailable in another area (e.g., an area in which the terminal device is currently located is an invalid or unavailable area of the network slice).

If the rejected NSSAI contains the rejection cause, the terminal device can start a first timer, and can not initiate a PDU session establishment request or a PDU session modification request for a network slice corresponding to a rejected S-NSSAI in the rejected NSSAI during the running of the first timer. After the first timer expires, i.e., after the first timer stops running, the terminal device transmits a PDU session establishment request or a PDU session modification request initiated for a network slice corresponding to at least one rejected S-NSSAI in the rejected NSSAI.

Two implementations of the first message will be described below in connection with the accompanying drawings.

A solution in which the first message is the registration response message will be introduced firstly. The registration response message can also be referred to as a registration accept message.

Figure 5:
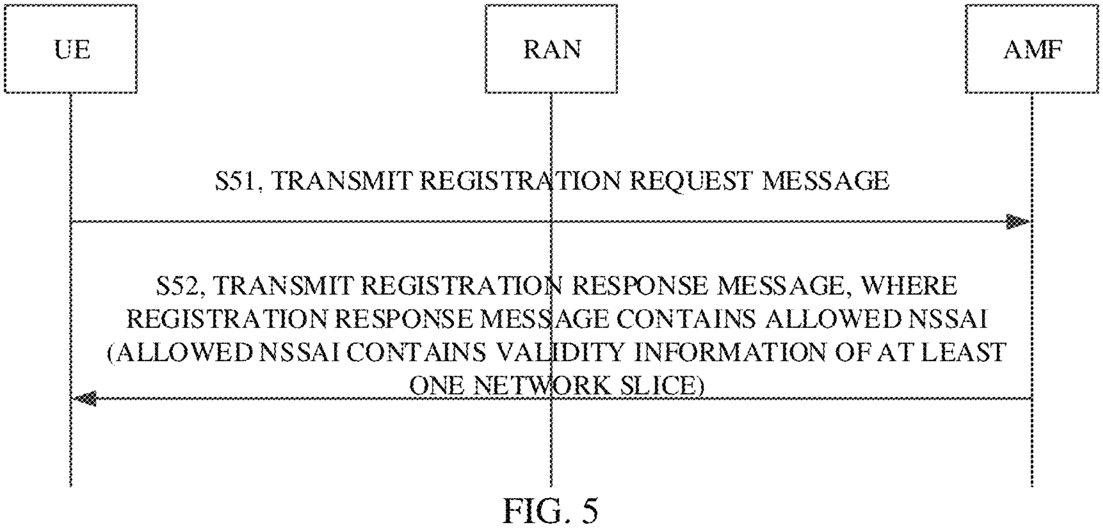
FIG. 5 is a signaling diagram I of a communication method provided in embodiments of the present disclosure.

FIG. 5 is a signaling diagram I of a communication method provided in embodiments of the present disclosure. As illustrated in FIG. 5, the communication method includes the following.

At S51, a terminal device transmits a registration request message to an AMF network element, where the registration request message contains a user identifier and/or a requested NSSAI.

During a process of initiating a registration request by the terminal device to the AMF network element, the user identifier and/or the requested NSSAI can be carried in the registration request message. The requested NSSAI is an NSSAI that the terminal device expects to use, the requested NSSAI contains an S-NSSAI that the terminal device expects to access, and the requested NSSAI is provided by the terminal device to the AMF network element.

At S52, the AMF network element transmits a registration response message to the terminal device, where the registration response message contains an allowed NSSAI, and the allowed NSSAI contains validity information of at least one network slice.

The AMF network element can transmit the registration response message to the terminal device, where the registration response message can contain the allowed NSSAI, and can also contain a 5G-GUTI and a registration area.

The allowed NSSAI is an S-NSSAI value that can be used by the terminal device in the registration area and is stored locally by the terminal device. In embodiments of the present disclosure, the allowed NSSAI can contain one or more S-NSSAI values. The allowed NSSAI can further contain location information and/or time information of the at least one network slice.

Location information of a network slice indicates a valid area and/or an invalid area of the network slice in a registration area of the terminal device. The location information may contain location validity information and/or location invalidity information, where the location validity information indicates the valid area of the network slice in the registration area, and the location invalidity information indicates the invalid area of the network slice in the registration area.

The location information may be a cell identifier and/or a TAI. If the allowed NSSAI contains the location validity information, the cell identifier and/or the TAI in the location validity information represents that a corresponding network slice is valid or available in an area indicated by the cell identifier and/or the TAI, i.e., the area indicated by the cell identifier and/or the TAI is the valid area of the network slice. Correspondingly, an area other than the valid area of the network slice in the registration area of the terminal device is the invalid area of the network slice, and the network slice is invalid or unavailable in the invalid area.

If the allowed NSSAI contains the location invalidity information, the cell identifier and/or the TAI in the location invalidity information represents that the corresponding network slice is invalid or unavailable in the area indicated by the cell identifier and/or the TAI, i.e., the area indicated by the cell identifier and/or the TAI is the invalid area of the network slice. Correspondingly, an area other than the invalid area of the network slice in the registration area of the terminal device is the valid area of the network slice, and the network slice is valid or available in the valid area.

Time information of the network slice indicates a valid time period and/or an invalid time period of the network slice. The time information may contain time validity information and/or time invalidity information, where the time validity information indicates the valid time period of the network slice, and the time invalidity information indicates the invalid time period of the network slice.

The time information may contain at least one of a start time, a duration, or a stop time, and a time period can be determined according to the at least one of the start time, the duration, or the stop time. For example, when the time information contains the start time, a time period indicated by the time information is a time period starting from the start time. When the time information contains the duration, the time period indicated by the time information is a time period of the duration, and the time period of the duration may start, for example, at a moment when the terminal device receives a registration accept message, or at the start time (if the time information contains the start time), etc. For example, when the time information contains the stop time, the time period indicated by the time information is a time period before the stop time.

If the allowed NSSAI contains the time validity information, a time period determined according to the time validity information represents that the corresponding network slice is valid or available during the time period, i.e., the time period is an available time period of the network slice. Correspondingly, the network slice is invalid or unavailable during a time period other than the time period, i.e., a time period other than the available time period is an unavailable time period of the network slice.

If the allowed NSSAI contains the time invalidity information, a time period determined according to the time invalidity information represents that the corresponding network slice is invalid or unavailable during the time period, i.e., the time period is the unavailable time period of the network slice. Correspondingly, the network slice is valid or available during a time period other than the time period, i.e., a time period other than the unavailable time period is the available time period of the network slice.

After obtaining the allowed NSSAI from the registration response message, the terminal device obtains the validity information of the at least one network slice from the allowed NSSAI. The allowed NSSAI can contain multiple S-NSSAI values, and the multiple S-NSSAI values identify multiple network slices. If the allowed NSSAI only contains validity information of some of the network slices, the other network slices will be valid for a long time.

After receiving the registration response message, the terminal device can return a registration complete message to the AMF network element for confirming that the 5G-GUTI is in effect and the registration is completed.

After obtaining the validity information, the terminal device can determine whether the network slice is available for the PDU session establishment request or the PDU session modification request according to the validity information. For example, if the network slice is valid and the terminal device has not established a PDU session with the network slice, the network slice is available for the PDU session establishment request or the PDU session modification request, and the terminal device can initiate the PDU session establishment request for the network slice. If the network slice is valid and the terminal device has established the PDU session with the network slice, the network slice is unavailable for the PDU session establishment request or the PDU session modification request, and the terminal device can not initiate the PDU session establishment request for the network slice. If the network slice is invalid and the terminal device has not established the PDU session with the network slice, the network slice is unavailable for the PDU session establishment request or the PDU session modification request, and the terminal device can not initiate the PDU session establishment request or the PDU session modification request for the network slice. If the network slice is invalid and the terminal device is trying to establish the PDU session with the network slice, the network slice is available for the PDU session establishment request or the PDU session modification request, and the terminal device can initiate the PDU session establishment request or the PDU session modification request for the network slice and can stop initiating the PDU session establishment request for the network slice and release user plane resources.

Figure 6:
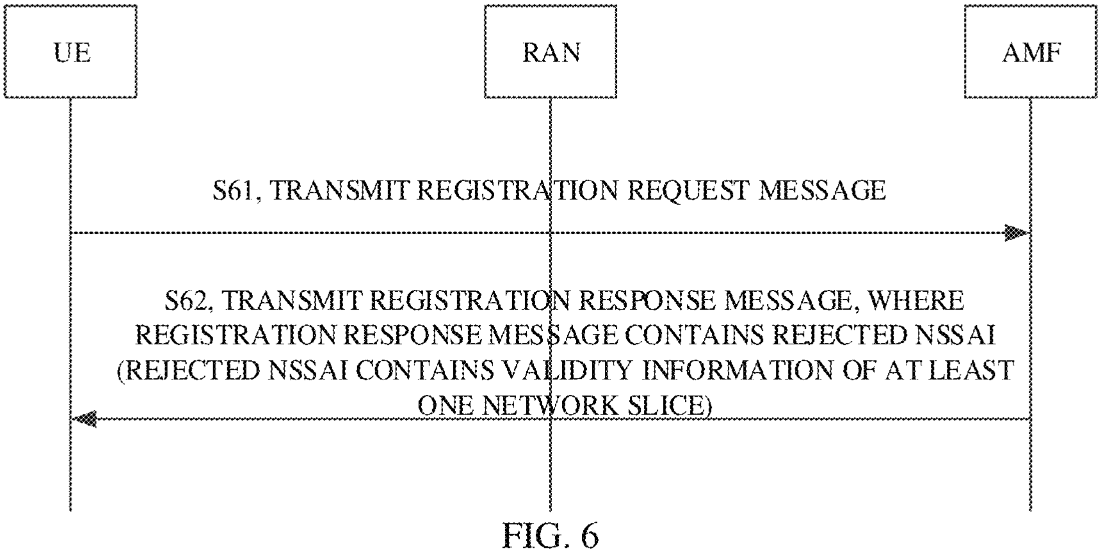
FIG. 6 is a signaling diagram II of a communication method provided in embodiments of the present disclosure.

FIG. 6 is a signaling diagram II of a communication method provided in embodiments of the present disclosure. As illustrated in FIG. 6, the communication method includes the following.

At S61, a terminal device transmits a registration request message to an AMF network element, where the registration request message contains a user identifier and/or a requested NSSAI.

During a process of initiating a registration request by the terminal device to the AMF network element, the user identifier and/or the requested NSSAI can be carried in the registration request message. The requested NSSAI is an NSSAI that the terminal device expects to use, the requested NSSAI contains an S-NSSAI that the terminal device expects to access, and the requested NSSAI is provided by the terminal device to the AMF network element.

At S62, the AMF network element transmits a registration response message to the terminal device, where the registration response message contains a rejected NSSAI, and the rejected NSSAI contains validity information of at least one network slice.

The AMF network element can transmit the registration response message to the terminal device, where the registration response message can contain the rejected NSSAI, and can also contain a 5G-GUTI and a registration area.

The rejected NSSAI is an NSSAI that is configured by the network and is not allowed to be accessed by the user. In embodiments of the present disclosure, the rejected NSSAI can contain one or more S-NSSAI values. The rejected NSSAI can further contain at least one of location information, time information, or a rejection cause of the at least one network slice.

Location information of a network slice indicates a valid area and/or an invalid area of the network slice in the registration area of the terminal device. The location information may contain location validity information and/or location invalidity information, where the location validity information indicates the valid area of the network slice in the registration area, and the location invalidity information indicates the invalid area of the network slice in the registration area.

The location information may be a cell identifier and/or a TAI. If the rejected NSSAI contains the location validity information, the cell identifier and/or the TAI in the location validity information represents that a corresponding network slice is valid or available in an area indicated by the cell identifier and/or the TAI, i.e., the area indicated by the cell identifier and/or the TAI is the valid area of the network slice. Correspondingly, an area other than the valid area of the network slice in the registration area of the terminal device is the invalid area of the network slice, and the network slice is invalid or unavailable in the invalid area.

If the rejected NSSAI contains the location invalidity information, the cell identifier and/or the TAI in the location invalidity information represents that a corresponding network slice is invalid or unavailable in the area indicated by the cell identifier and/or the TAI, i.e., the area indicated by the cell identifier and/or the TAI is the invalid area of the network slice. Correspondingly, an area other than the invalid area of the network slice in the registration area of the terminal device is the valid area of the network slice, and the network slice is valid or available in the valid area.

Time information of the network slice indicates a valid time period and/or an invalid time period of the network slice. The time information may contain time validity information and/or time invalidity information, where the time validity information indicates the valid time period of the network slice, and the time invalidity information indicates the invalid time period of the network slice.

The time information may contain at least one of a start time, a duration, or a stop time, and a time period can be determined according to the at least one of the start time, the duration, or the stop time. For example, when the time information contains the start time, a time period indicated by the time information is a time period starting from the start time. When the time information contains the duration, the time period indicated by the time information is a time period of the duration, and the time period of the duration may start, for example, at a moment when the terminal device receives the registration accept message, at the start time (if the time information contains the start time), etc. For example, when the time information contains the stop time, the time period indicated by the time information is a time period before the stop time.

If the rejected NSSAI contains the time validity information, a time period determined according to the time validity information represents that the corresponding network slice is valid or available during the time period, i.e., the time period is an available time period of the network slice. Correspondingly, the network slice is invalid or unavailable during a time period other than the time period, i.e., a time period other than the available time period is an unavailable time period of the network slice.

If the rejected NSSAI contains the time invalidity information, a time period determined according to the time invalidity information represents that the corresponding network slice is invalid or unavailable during the time period, i.e., the time period is the unavailable time period of the network slice. Correspondingly, the network slice is valid or available during a time period other than the time period, i.e., a time period other than the unavailable time period is the available time period of the network slice.

If the validity information contains the rejection cause, the terminal device can actively start a first timer. During the running of the first timer, the terminal device can not request from the corresponding network slice to establish a PDU session. After the first timer expires, the terminal device can request from the corresponding network slice to establish the PDU session, thereby avoiding frequent requests from the terminal device to establish the PDU session during a certain time period and wasting signaling. A duration and a start of the first timer may be configured by a network device to the terminal device or may be determined by the terminal device.

After obtaining the rejected NSSAI from the registration response message, the terminal device obtains the validity information of the at least one network slice from the rejected NSSAI. After receiving the registration accept message, the terminal device can return a registration complete message to the AMF network element for confirming that the 5G-GUTI is in effect and the registration is completed.

After obtaining the validity information, the terminal device can determine whether the network slice is available for the PDU session establishment request or the PDU session modification request according to the validity information. For example, if the network slice is valid and the terminal device has not established a PDU session with the network slice, the network slice is available for the PDU session establishment request or the PDU session modification request, and the terminal device can initiate the PDU session establishment request for the network slice. If the network slice is valid and the terminal device has established the PDU session with the network slice, the network slice is unavailable for the PDU session establishment request or the PDU session modification request, and the terminal device can not initiate the PDU session establishment request for the network slice. If the network slice is invalid and the terminal device has not established the PDU session with the network slice, the network slice is unavailable for the PDU session establishment request or the PDU session modification request, and the terminal device can not initiate the PDU session establishment request or the PDU session modification request for the network slice. If the network slice is invalid and the terminal device is trying to establish the PDU session with the network slice, the network slice is available for the PDU session establishment request or the PDU session modification request, and the terminal device can initiate the PDU session establishment request or the PDU session modification request for the network slice and can stop initiating the PDU session establishment request for the network slice and release user plane resources.

In FIG. 5 and FIG. 6, a solution of carrying the validity information of the network slice in the registration response message is illustrated. In the example of FIG. 5, the registration response message contains the allowed NSSAI, and the allowed NSSAI contains the validity information of the at least one network slice. In the example of FIG. 6, the registration response message contains the rejected NSSAI, and the rejected NSSAI contains the validity information of the at least one network slice. It may be understood that the registration response message may contain either the allowed NSSAI or the rejected NSSAI, or may contain both the allowed NSSAI and the rejected NSSAI. The terminal device can know, according to the allowed NSSAI and/or the rejected NSSAI, in which area the temporarily deployed network slice is valid or available, in which time period the temporarily deployed network slice is valid or available, in which area the temporarily deployed network slice is invalid or unavailable, in which time period the temporarily deployed network slice is invalid or unavailable, etc. Then, the terminal device can determine whether the network slice is available for the PDU session establishment request or the PDU session modification request according to the validity information. When the network slice is available for the PDU session establishment request or the PDU session modification request, the terminal device can initiate the PDU session establishment request or the PDU session modification request for the network. When the network slice is unavailable for the PDU session establishment request or the PDU session modification request, the terminal device can not initiate the PDU session establishment request or the PDU session modification request for the network slice. Further, in embodiments of the present disclosure, reception of the validity information may be realized through a registration process of the terminal device. In this way, the existing registration response message is fully utilized to receive the validity information, and signaling can further be saved.

In the above embodiments, the solution in which the first message is the registration response message is introduced.

A solution in which the first message is a terminal configuration update message will be introduced below in connection with FIG. 7 and FIG. 8.

Figure 7:
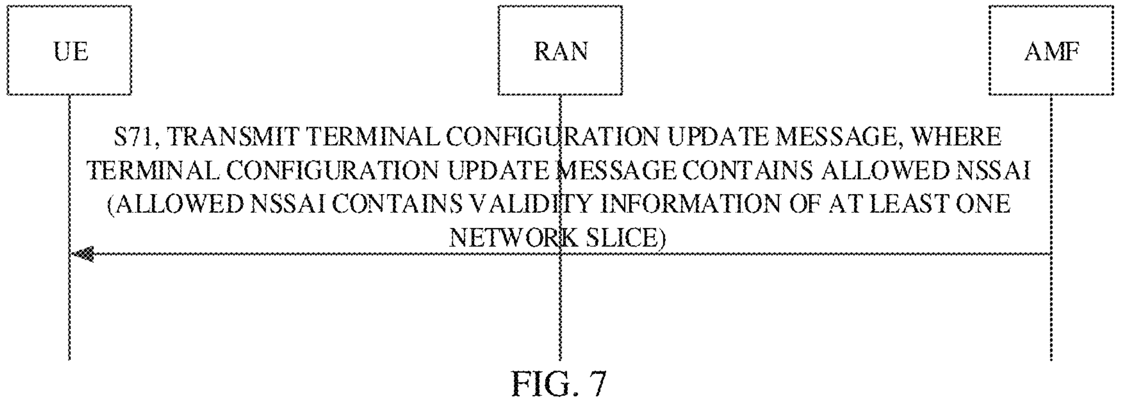
FIG. 7 is a signaling diagram III of a communication method provided in embodiments of the present disclosure.

FIG. 7 is a signaling diagram III of a communication method provided in embodiments of the present disclosure. As illustrated in FIG. 7, the communication method includes the following.

At S71, an AMF network element transmits a terminal configuration update message to a terminal device, where the terminal configuration update message contains an allowed NSSAI, and the allowed NSSAI contains validity information of at least one network slice.

After the terminal device completes registration, if some slice service adjustments occur on the network device side, a network device can further notify the terminal device of this through a configuration update process.

Specifically, the AMF network element can transmit the terminal configuration update message to the terminal device, and the terminal configuration update message can contain the allowed NSSAI. Further, the terminal configuration update message can contain a registration area of the terminal device.

In embodiments of the present disclosure, the allowed NSSAI can contain one or more S-NSSAI values, and the allowed NSSAI can further contain location information and/or time information of the at least one network slice.

Location information of a network slice indicates a valid area and/or an invalid area of the network slice in the registration area of the terminal device. The location information may contain location validity information and/or location invalidity information, where the location validity information indicates the valid area of the network slice in the registration area, and the location invalidity information indicates the invalid area of the network slice in the registration area.

The location information may be a cell identifier and/or a TAI. If the allowed NSSAI contains the location validity information, the cell identifier and/or the TAI in the location validity information represents that a corresponding network slice is valid or available in an area indicated by the cell identifier and/or the TAI, i.e., the area indicated by the cell identifier and/or the TAI is the valid area of the network slice. Correspondingly, an area other than the valid area of the network slice in the registration area of the terminal device is the invalid area of the network slice, and the network slice is invalid or unavailable in the invalid area.

If the allowed NSSAI contains the location invalidity information, the cell identifier and/or the TAI in the location invalidity information represents that a corresponding network slice is invalid or unavailable in the area indicated by the cell identifier and/or the TAI, i.e., the area indicated by the cell identifier and/or the TAI is the invalid area of the network slice. Correspondingly, an area other than the invalid area of the network slice in the registration area of the terminal device is the valid area of the network slice, and the network slice is valid or available in the valid area.

Time information of the network slice indicates a valid time period and/or an invalid time period of the network slice. The time information may contain time validity information and/or time invalidity information, where the time validity information indicates the valid time period of the network slice, and the time invalidity information indicates the invalid time period of the network slice.

The time information may contain at least one of a start time, a duration, or a stop time, and a time period can be determined according to the at least one of the start time, the duration, or the stop time. For example, when the time information contains the start time, a time period indicated by the time information is a time period starting from the start time. When the time information contains the duration, the time period indicated by the time information is a time period of the duration, and the time period of the duration may start, for example, at a moment when the terminal device receives the registration accept message, at the start time (if the time information contains the start time), etc. For example, when the time information contains the stop time, the time period indicated by the time information is a time period before the stop time.

If the allowed NSSAI contains the time validity information, a time period determined according to the time validity information represents that the corresponding network slice is valid or available during the time period, i.e., the time period is an available time period of the network slice. Correspondingly, the network slice is invalid or unavailable during a time period other than the time period, i.e., a time period other than the available time period is an unavailable time period of the network slice.

If the allowed NSSAI contains the time invalidity information, a time period determined according to the time invalidity information represents that the corresponding network slice is invalid or unavailable during the time period, i.e., the time period is the unavailable time period of the network slice. Correspondingly, the network slice is valid or available during a time period other than the time period, i.e., a time period other than the unavailable time period is the available time period of the network slice.

After obtaining the allowed NSSAI from the terminal configuration update message, the terminal device obtains the validity information of the at least one network slice from the allowed NSSAI. The allowed NSSAI can contain multiple S-NSSAI values, and the multiple S-NSSAI values identify multiple network slices. If the allowed NSSAI only contains validity information of some of the network slices, the other network slices will be valid for a long time.

After receiving the terminal configuration update message, the terminal device can return a configuration update response message to the AMF network element for confirming that a configuration update is completed.

After obtaining the validity information, the terminal device can select a valid or available first target network slice from the network slices according to the validity information and establish a PDU session with the first target network slice. The terminal device can also select an invalid or unavailable second target network slice from the network slices according to the validity information and stop establishing a PDU session with the second target network slice and release user plane resources.

Figure 8:
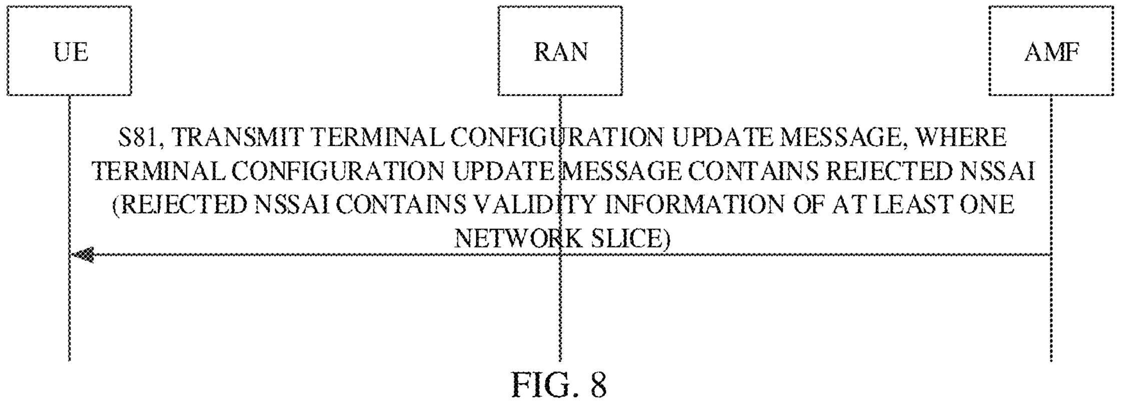
FIG. 8 is a signaling diagram IV of a communication method provided in embodiments of the present disclosure.

FIG. 8 is a signaling diagram IV of a communication method provided in embodiments of the present disclosure. As illustrated in FIG. 8, the communication method includes the following.

At S81, an AMF network element transmits a terminal configuration update message to a terminal device, where the terminal configuration update message contains a rejected NSSAI, and the rejected NSSAI contains validity information of at least one network slice.

After the terminal device completes registration, if some slice service adjustments occur on the network device side, a network device can further notify the terminal device of this through a configuration update process.

Specifically, the AMF network element can transmit the terminal configuration update message to the terminal device, and the terminal configuration update message can contain the rejected NSSAI. Further, the terminal configuration update message can contain a registration area of the terminal device.

In embodiments of the present disclosure, the rejected NSSAI is an NSSAI that is configured by the network and is not allowed to be accessed by the user. In embodiments of the present disclosure, the rejected NSSAI can contain one or more S-NSSAI values. The rejected NSSAI can further contain at least one of location information, time information, or a rejection cause of the at least one network slice.

Location information of a network slice indicates a valid area and/or an invalid area of the network slice in the registration area of the terminal device. The location information may contain location validity information and/or location invalidity information, where the location validity information indicates the valid area of the network slice in the registration area, and the location invalidity information indicates the invalid area of the network slice in the registration area.

The location information may be a cell identifier and/or a TAI. If the rejected NSSAI contains the location validity information, the cell identifier and/or the TAI in the location validity information represents that a corresponding network slice is valid or available in an area indicated by the cell identifier and/or the TAI, i.e., the area indicated by the cell identifier and/or the TAI is the valid area of the network slice. Correspondingly, an area other than the valid area of the network slice in the registration area of the terminal device is the invalid area of the network slice, and the network slice is invalid or unavailable in the invalid area.

If the rejected NSSAI contains the location invalidity information, the cell identifier and/or the TAI in the location invalidity information represents that a corresponding network slice is invalid or unavailable in the area indicated by the cell identifier and/or the TAI, i.e., the area indicated by the cell identifier and/or the TAI is the invalid area of the network slice. Correspondingly, an area other than the invalid area of the network slice in the registration area of the terminal device is the valid area of the network slice, and the network slice is valid or available in the valid area.

Time information of the network slice indicates a valid time period and/or an invalid time period of the network slice. The time information may contain time validity information and/or time invalidity information, where the time validity information indicates the valid time period of the network slice, and the time invalidity information indicates the invalid time period of the network slice.

The time information may contain at least one of a start time, a duration, or a stop time, and a time period can be determined according to the at least one of the start time, the duration, or the stop time. For example, when the time information contains the start time, a time period indicated by the time information is a time period starting from the start time. When the time information contains the duration, the time period indicated by the time information is a time period of the duration, and the time period of the duration may start, for example, at a moment when the terminal device receives the registration accept message, at the start time (if the time information contains the start time), etc. For example, when the time information contains the stop time, the time period indicated by the time information is a time period before the stop time.

If the rejected NSSAI contains the time validity information, a time period determined by the time validity information represents that the corresponding network slice is valid or available during the time period, i.e., the time period is an available time period of the network slice. Correspondingly, the network slice is invalid or unavailable during a time period other than the time period, i.e., a time period other than the available time period is an unavailable time period of the network slice.

If the rejected NSSAI contains the time invalidity information, a time period determined by the time invalidity information represents that the corresponding network slice is invalid or unavailable during the time period, i.e., the time period is the unavailable time period of the network slice. Correspondingly, the network slice is valid or available during a time period other than the time period, i.e., a time period other than the unavailable time period is the available time period of the network slice.

If the validity information contains the rejection cause, the terminal device can actively start a first timer. During the running of the first timer, the terminal device can not request from the corresponding network slice to establish a PDU session. After the first timer expires, the terminal device can request from the corresponding network slice to establish the PDU session, thereby avoiding frequent requests from the terminal device to establish the PDU session during a certain time period and wasting signaling. A duration and a start of the first timer may be configured by a network device to the terminal device or may be determined by the terminal device.

After obtaining the rejected NSSAI from the terminal configuration update message, the terminal device obtains the validity information of the at least one network slice from the rejected NSSAI. After receiving the terminal configuration update message, the terminal device can return a configuration update response message to the AMF network element for confirming that a configuration update is completed.

After obtaining the validity information, the terminal device can determine whether the network slice is available for the PDU session establishment request or the PDU session modification request according to the validity information. For example, if the network slice is valid and the terminal device has not established a PDU session with the network slice, the network slice is available for the PDU session establishment request or the PDU session modification request, and the terminal device can initiate the PDU session establishment request for the network slice. If the network slice is valid and the terminal device has established the PDU session with the network slice, the network slice is unavailable for the PDU session establishment request or the PDU session modification request, and the terminal device can not initiate the PDU session establishment request for the network slice. If the network slice is invalid and the terminal device has not established the PDU session with the network slice, the network slice is unavailable for the PDU session establishment request or the PDU session modification request, and the terminal device can not initiate the PDU session establishment request or the PDU session modification request for the network slice. If the network slice is invalid and the terminal device is trying to establish the PDU session with the network slice, the network slice is available for the PDU session establishment request or the PDU session modification request, and the terminal device can initiate the PDU session establishment request or the PDU session modification request for the network slice and can stop initiating the PDU session establishment request for the network slice and release user plane resources.

In FIG. 7 and FIG. 8, a solution of carrying the validity information of the network slice in the terminal configuration update message is illustrated. In the example of FIG. 7, the terminal configuration update message contains the allowed NSSAI, and the allowed NSSAI contains the validity information of the at least one network slice. In the example of FIG. 8, the terminal configuration update message contains the rejected NSSAI, and the rejected NSSAI contains the validity information of the at least one network slice. It may be understood that the terminal configuration update message may contain either the allowed NSSAI or the rejected NSSAI, or may contain both the allowed NSSAI and the rejected NSSAI. The terminal device can know, according to the allowed NSSAI and/or the rejected NSSAI, in which area the temporarily deployed network slice is valid or available, in which time period the temporarily deployed network slice is valid or available, in which area the temporarily deployed network slice is invalid or unavailable, in which time period the temporarily deployed network slice is invalid or unavailable, etc. Then, the terminal device can determine whether the network slice is available for the PDU session establishment request or the PDU session modification request according to the validity information. When the network slice is available for the PDU session establishment request or the PDU session modification request, the terminal device can initiate the PDU session establishment request or the PDU session modification request for the network. When the network slice is unavailable for the PDU session establishment request or the PDU session modification request, the terminal device can not initiate the PDU session establishment request or the PDU session modification request for the network slice. Further, in embodiments of the present disclosure, reception of the validity information may be realized through a configuration update process of the terminal device. In this way, the existing terminal configuration update message is fully utilized to receive the validity information, and signaling can further be saved.

In the above embodiments, a situation where the validity information is carried in the first message is introduced. In some embodiments, the validity information may also be carried in a second message, and the network device transmits the second message to the terminal device. The terminal device obtains the validity information after receiving the second message from the network device.

Optionally, the second message is a broadcast message transmitted by the network device. Optionally, the broadcast message contains slice information, and the validity information is carried in the slice information. Slice information of the network slice may be carried in a system information block (SIB). In this case, the network device broadcasts through the SIB, and the terminal device obtains the slice information from the SIB. The slice information of the network slice may also be carried in a dedicated signaling. In this case, the terminal device receives the dedicated signaling from the network device, and then obtains the slice information from the dedicated signaling. Optionally, when the validity information is carried in the second message, the network device is a RAN.

The slice information may contain slice information of a network slice valid in a cell in which the terminal device is located, and may also contain slice information of a network slice valid in a neighboring cell of the cell in which the terminal device is located.

The slice information of the network slice may contain at least one of a network slice identifier, a network slice group identifier, a frequency point corresponding to the network slice, a priority of the frequency point corresponding to the network slice, location information corresponding to the network slice, or time information corresponding to the network slice. When the slice information contains the network slice identifier, a network slice corresponding to the network slice identifier is a network slice currently supported or to be supported. When the slice information contains the network slice group identifier, a network slice in a network slice group corresponding to the network slice group identifier is a network slice currently supported or to be supported. When the slice information contains the frequency point corresponding to the network slice and the priority of the frequency point, a corresponding network slice may be selected as a network slice corresponding to a requested NSSAI according to the priority of the frequency point. When the slice information contains the location information corresponding to the network slice, a valid area and/or an invalid area of the corresponding network slice may be determined according to the location information. When the slice information contains the time information corresponding to the network slice, a valid time period and/or an invalid time period of the corresponding network slice may be determined according to the time information. The time information and the location information in the slice information are the validity information of the network slice.

The location information in the slice information may be a cell identifier and/or a TAI. When the location information indicates the valid area of the network slice, the valid area may be a coverage area of a cell corresponding to the cell identifier and/or an area corresponding to the TAI. When the location information indicates the invalid area of the network slice, the invalid area may be the coverage area of the cell corresponding to the cell identifier and/or the area corresponding to the TAI.

The time information in the slice information may contain at least one of a start time, a duration, or a stop time. A time period can be determined according to the at least one of the start time, the duration, or the stop time. When the time information indicates the valid time period of the network slice, the valid time period is a time period determined according to the at least one of the start time, the duration, or the stop time. When the time information indicates the invalid time period of the network slice, the invalid time period is the time period determined according to the at least one of the start time, the duration, or the stop time.

After receiving the slice information from the network device, the terminal device can determine a requested network slice according to the slice information, which will be described below in conjunction with FIG. 9 and FIG. 10.

Figure 9:
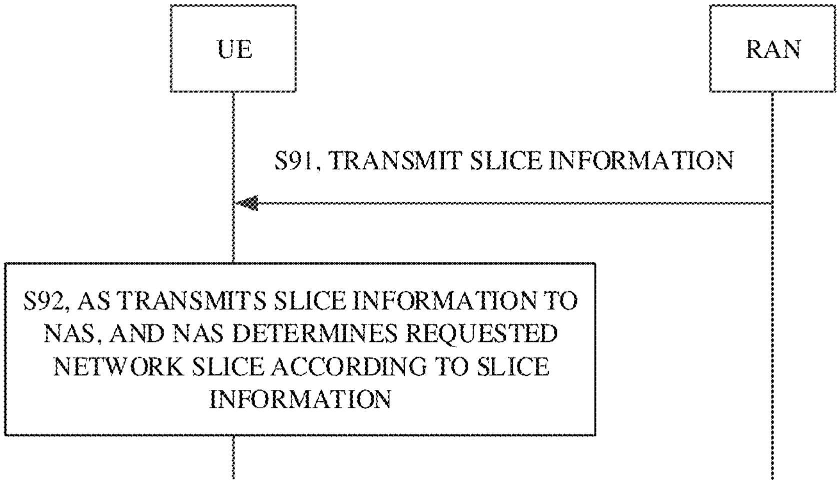
FIG. 9 is a schematic diagram of determination of a requested network slice provided in embodiments of the present disclosure.

FIG. 9 is a schematic diagram of determination of a requested network slice provided in embodiments of the present disclosure. As illustrated in FIG. 9, the requested network slice is determined as follows.

At S91, a RAN transmits slice information to a terminal device.

The slice information may be slice information of a network slice valid in a cell in which the terminal device is located and/or slice information of a network slice valid in a neighboring cell of the cell in which the terminal device is located.

The slice information may contain at least one of a network slice identifier, a network slice group identifier, a frequency point corresponding to a network slice, a priority of the frequency point corresponding to the network slice, location information corresponding to a network slice, or time information corresponding to a network slice. When the slice information contains the network slice identifier, a network slice corresponding to the network slice identifier is a network slice currently supported or to be supported. When the slice information contains the network slice group identifier, a network slice in a network slice group corresponding to the network slice group identifier is a network slice currently supported or to be supported. When the slice information contains the frequency point corresponding to the network slice and the priority of the frequency point, a corresponding network slice may be selected as a network slice corresponding to a requested NSSAI according to the priority of the frequency point. When the slice information contains the location information corresponding to the network slice, a valid area and/or an invalid area of the corresponding network slice may be determined according to the location information. When the slice information contains the time information corresponding to the network slice, a valid time period and/or an invalid time period of the corresponding network slice may be determined according to the time information.

At S92, a NAS determines the requested network slice according to slice information reported by an access stratum (AS).

After obtaining slice information of a network slice, the AS can report the slice information to the NAS. After receiving the slice information, the NAS of the terminal device can know which network slice is available and which network slice is unavailable according to the slice information. Alternatively, as for a temporarily deployed network slice, the terminal device can know under what circumstances the temporarily deployed network slice is available and under what circumstances the temporarily deployed network slice is unavailable according to the slice information. The NAS can then determine the requested network slice according to the slice information. According to the above solution, a final requested network slice is available or will be available.

Figure 10:
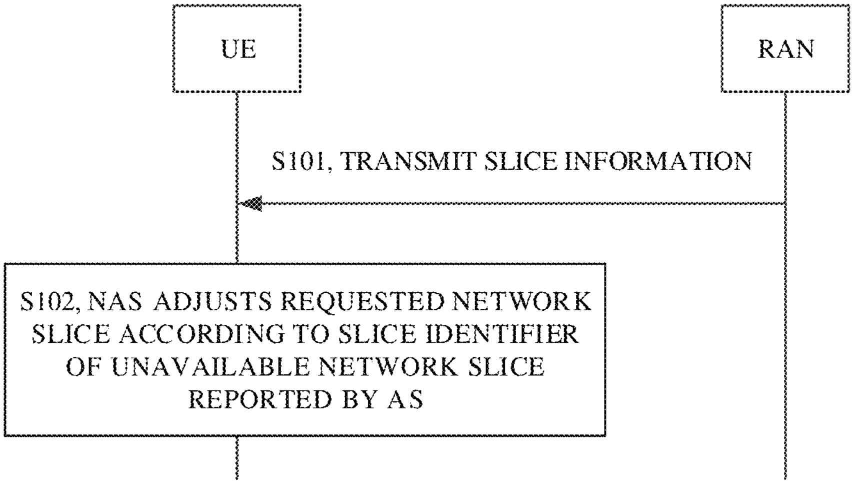
FIG. 10 is a schematic diagram of determination of a requested network slice provided in embodiments of the present disclosure.

FIG. 10 is a schematic diagram of determination of a requested network slice provided in embodiments of the present disclosure. As illustrated in FIG. 10, the requested network slice is determined as follows.

At S101, a RAN transmits slice information to a terminal device.

The slice information may be slice information of a network slice valid in a cell in which the terminal device is located and/or slice information of a network slice valid in a neighboring cell of the cell in which the terminal device is located.

The slice information may contain at least one of a network slice identifier, a network slice group identifier, a frequency point corresponding to a network slice, a priority of the frequency point corresponding to the network slice, location information corresponding to a network slice, or time information corresponding to a network slice. When the slice information contains the network slice identifier, a network slice corresponding to the network slice identifier is a network slice currently supported or to be supported. When the slice information contains the network slice group identifier, a network slice in a network slice group corresponding to the network slice group identifier is a network slice currently supported or to be supported. When the slice information contains the frequency point corresponding to the network slice and the priority of the frequency point, a corresponding network slice may be selected as a network slice corresponding to a requested NSSAI according to the priority of the frequency point. When the slice information contains the location information corresponding to the network slice, a valid area and/or an invalid area of the corresponding network slice may be determined according to the location information. When the slice information contains the time information corresponding to the network slice, a valid time period and/or an invalid time period of the corresponding network slice may be determined according to the time information.

At S102, a NAS adjusts the requested network slice according to a slice identifier of an unavailable network slice reported by an AS.

The NAS of the terminal device can first transmit a slice identifier of an initially requested network slice to the AS. The initially requested network slice may include a network slice that is valid for a long time, or may include a temporarily deployed network slice that is valid only under certain conditions. Therefore, the AS can determine under what conditions the temporarily deployed network slice is available and under what conditions the temporarily deployed network slice is unavailable according to the slice information, and then may determine the slice identifier of the unavailable network slice. Further, the AS can transmit the slice identifier of the unavailable network slice to the NAS according to the slice information. After receiving the slice identifier of the unavailable network slice, the NAS can adjust the requested network slice according to the slice identifier of the unavailable network slice. According to the above solution, a final requested network slice is available or will be available. After the slice information is adjusted, for example, after a previously unavailable network slice becomes an available network slice, the AS can notify the NAS that the unavailable network slice currently becomes available, and the NAS can adjust the requested network slice in response to the notification from the AS.

According to the solution of determining the requested network slice illustrated in FIG. 10, the AS can promptly notify the NAS which network slice is unavailable after obtaining the slice information, and the NAS can promptly adjust the requested network slice according to the notification from the AS, such that the requested network slice is available or will be available.

Figure 11:
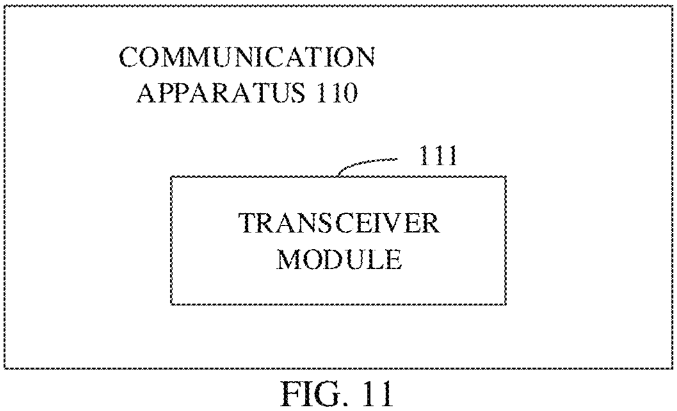
FIG. 11 is a schematic structural diagram I of a communication apparatus provided in embodiments of the present disclosure.

FIG. 11 is a schematic structural diagram of a communication apparatus provided in embodiments of the present disclosure I. As illustrated in FIG. 11, the communication apparatus 110 includes a transceiver module 111. The transceiver module 111 is configured to receive validity information of a network slice from a network device, where the validity information indicates whether the network slice is available for a PDU session establishment request or a PDU session modification request.

In a possible implementation, the validity information contains at least one of location information or time information. The location information indicates a valid area and/or an invalid area of the network slice. The time information indicates a valid time period and/or an invalid time period of the network slice.

In a possible implementation, the location information contains location validity information indicating the valid area of the network slice and/or location invalidity information indicating the invalid area of the network slice. The time information contains time validity information indicating the valid time period of the network slice and/or time invalidity information indicating the invalid time period of the network slice.

In a possible implementation, the location validity information contains a first cell identifier and/or a first TAI. The location invalidity information contains a second cell identifier and/or a second TAI. The time validity information contains at least one of a first start time, a first duration, or a first stop time. The time invalidity information contains at least one of a second start time, a second duration, or a second stop time.

In a possible implementation, the communication apparatus 110 further includes a processing module. The processing module is configured to determine whether to transmit the PDU session establishment request and/or the PDU session modification request for the network slice according to the location information and/or the time information.

In a possible implementation, the processing module is specifically configured to determine whether the network slice is available for the PDU session establishment request or the PDU session modification request according to the location information and/or the time information, initiate the PDU session establishment request or the PDU session modification request for the network slice in a case where the network slice is available for the PDU session establishment request or the PDU session modification request, and/or skip initiating the PDU session establishment request or the PDU session modification request for the network slice in a case where the network slice is unavailable for the PDU session establishment request or the PDU session modification request.

In a possible implementation, the validity information is carried in any one of the following messages transmitted by the network device: a first message, where the first message is a registration response message for a registration request message transmitted by the terminal device or a terminal configuration update message, or a second message.

In a possible implementation, the first message carries an NSSAI, the validity information is carried in the NSSAI, and the NSSAI includes an allowed NSSAI and/or a rejected NSSAI.

In a possible implementation, the allowed NSSAI contains the location information and/or the time information when the NSSAI includes the allowed NSSAI. The rejected NSSAI contains the location information and/or the time information when the NSSAI includes the rejected NSSAI.

In a possible implementation, the rejected NSSAI further contains a rejection cause, where the rejection cause is used for notifying a network slice supported in a partial area and/or a temporary area.

In a possible implementation, the first message carries the NSSAI, and the NSSAI includes the allowed NSSAI and/or the rejected NSSAI, where the validity information is carried in the allowed NSSAI, the rejected NSSAI contains the rejection cause, and the rejection cause is used for notifying the network slice supported in the partial area and/or the temporary area.

In a possible implementation, the rejected NSSAI contains at least one rejected S-NSSAI, and the communication apparatus 110 further includes a processing module. The processing module is configured to start a first timer, and initiate the PDU session establishment request or the PDU session modification request for a network slice corresponding to the at least one rejected S-NSSAI in the rejected NSSAI upon expiration of the first timer.

In a possible implementation, the network device is a core network device, and the core network device includes an AMF.

In a possible implementation, the second message is a broadcast message transmitted by the network device.

In a possible implementation, the broadcast message contains slice information, and the validity information is carried in the slice information.

In a possible implementation, the slice information is slice information of a network slice valid in a cell of the terminal device and/or slice information of a network slice valid in a neighboring cell of the cell.

In a possible implementation, the slice information further contains at least one of: a network slice identifier, a network slice group identifier, a frequency point corresponding to a network slice, or a priority of the frequency point.

In a possible implementation, the broadcast message is an SIB.

In a possible implementation, the communication apparatus 110 further includes a processing module. The processing module is configured to determine a requested network slice according to the slice information.

In a possible implementation, the processing module is specifically configured to determine, by a NAS, the requested network slice according to slice information reported by an AS.

In a possible implementation, the processing module is specifically configured to adjust, by the NAS, the requested network slice according to a slice identifier of an unavailable network slice reported by the AS.

In a possible implementation, the processing module is also configured to transmit, by the NAS, the requested network slice to the AS before the AS reports the slice information, and transmit, by the AS, the slice identifier of the unavailable network slice to the NAS according to the slice information.

In a possible implementation, the processing module is also configured to notify, by the AS, the NAS that the unavailable network slice is available when the unavailable network slice becomes available, and adjust, by the NAS, the requested network slice in response to the notification.

In a possible implementation, the network device is a RAN.

The communication apparatus provided in embodiments of the present disclosure can perform technical solutions illustrated in the above method embodiments, and the implementation principles and beneficial effects thereof are similar and thus will not be described again herein.

Figure 12:
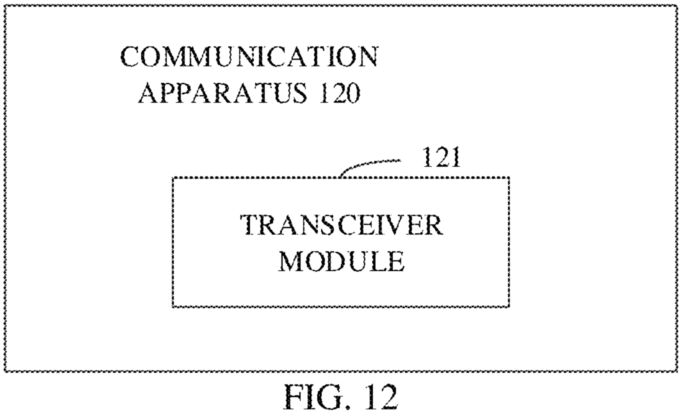
FIG. 12 is a schematic structural diagram II of a communication apparatus provided in embodiments of the present disclosure.

FIG. 12 is a schematic structural diagram II of a communication apparatus provided in embodiments of the present disclosure. As illustrated in FIG. 12, the communication apparatus 120 includes a transceiver module 121. The transceiver module 121 is configured to transmit validity information of a network slice to a terminal device, where the validity information indicates whether the network slice is available for a PDU session establishment request or a PDU session modification request.

In a possible implementation, the validity information contains at least one of location information or time information. The location information indicates a valid area and/or an invalid area of the network slice. The time information indicates a valid time period and/or an invalid time period of the network slice.

In a possible implementation, the location information contains location validity information indicating the valid area of the network slice and/or location invalidity information indicating the invalid area of the network slice. The time information contains time validity information indicating the valid time period of the network slice and/or time invalidity information indicating the invalid time period of the network slice.

In a possible implementation, the location validity information contains a first cell identifier and/or a first TAI. The location invalidity information contains a second cell identifier and/or a second TAI. The time validity information contains at least one of a first start time, a first duration, or a first stop time. The time invalidity information contains at least one of a second start time, a second duration, or a second stop time.

In a possible implementation, the validity information is carried in any one of the following messages transmitted by the network device: a first message, where the first message is a registration response message for a registration request message transmitted by the terminal device or a terminal configuration update message, or a second message.

In a possible implementation, the first message carries an NSSAI, the validity information is carried in the NSSAI, and the NSSAI includes an allowed NSSAI and/or a rejected NSSAI.

In a possible implementation, the allowed NSSAI contains the location information and/or the time information when the NSSAI includes the allowed NSSAI. The rejected NSSAI contains the location information and/or the time information when the NSSAI includes the rejected NSSAI.

In a possible implementation, the rejected NSSAI further contains a rejection cause, where the rejection cause is used for notifying a network slice supported in a partial area and/or a temporary area.

In a possible implementation, the first message carries the NSSAI, and the NSSAI includes the allowed NSSAI and/or the rejected NSSAI, where the validity information is carried in the allowed NSSAI, the rejected NSSAI contains the rejection cause, and the rejection cause is used for notifying the network slice supported in the partial area and/or the temporary area.

In a possible implementation, the rejected NSSAI contains at least one rejected S-NSSAI.

In a possible implementation, the network device is a core network device, and the core network device includes an AMF.

In a possible implementation, the second message is a broadcast message transmitted by the network device.

In a possible implementation, the broadcast message contains slice information, and the validity information is carried in the slice information.

In a possible implementation, the slice information is slice information of a network slice valid in a cell of the terminal device and/or slice information of a network slice valid in a neighboring cell of the cell.

In a possible implementation, the slice information further contains at least one of: a network slice identifier, a network slice group identifier, a frequency point corresponding to a network slice, or a priority of the frequency point.

In a possible implementation, the broadcast message is an SIB.

In a possible implementation, the network device is a RAN.

The communication apparatus provided in embodiments of the present disclosure can perform technical solutions illustrated in the above method embodiments, and the implementation principles and beneficial effects thereof are similar and thus will not be described again herein.

Figure 13:
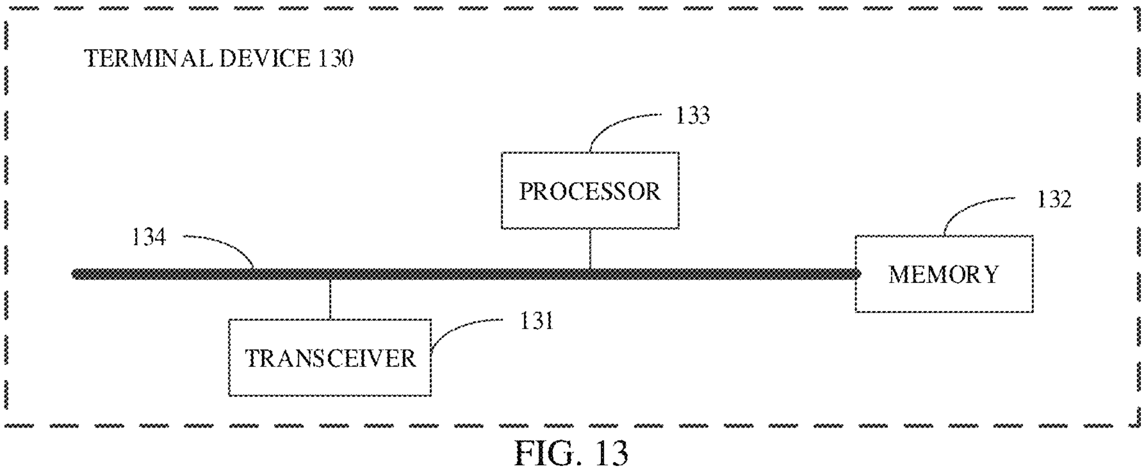
FIG. 13 is a schematic structural diagram of a terminal device provided in embodiments of the present disclosure.

FIG. 13 is a schematic structural diagram of a terminal device provided in embodiments of the present disclosure. As illustrated in FIG. 13, the terminal device 130 can include a transceiver 131, a memory 132, and a processor 133. The transceiver 131 may include a transmitter and/or a receiver. The transmitter may also be referred to as a transmitting port, a transmitting interface, or similar descriptions, and the receiver may also be referred to as a receiving port, a receiving interface, or similar descriptions. Exemplarily, the transceiver 131, the memory 132, and the processor 133 may be connected with each other via a bus 134. The memory 132 is configured to store program instructions. The processor 133 is configured to execute the program instructions stored in the memory, to cause the terminal device 130 to implement any of the communication methods. The receiver of the transceiver 131 can be configured to implement a receiving function of the terminal device in the communication methods.

Figure 14:
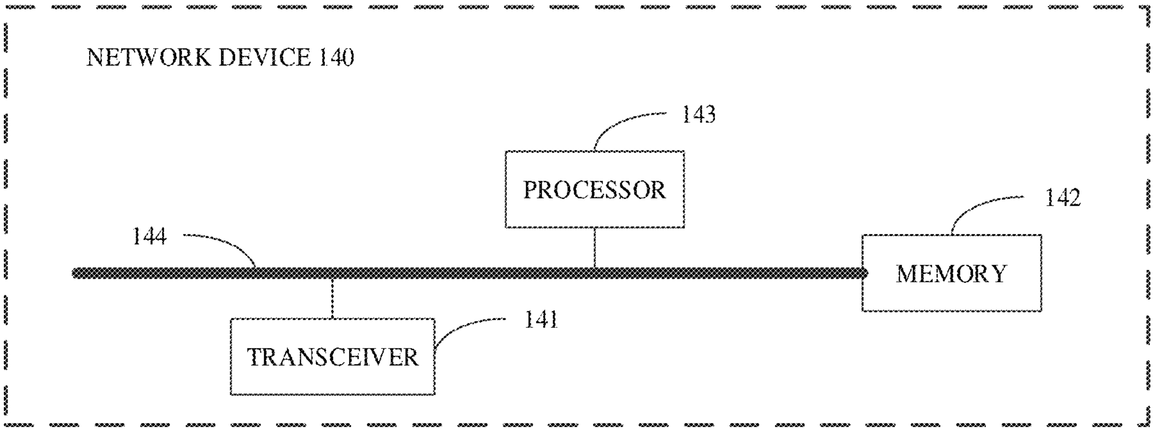
FIG. 14 is a schematic structural diagram of a network device provided in embodiments of the present disclosure.

FIG. 14 is a schematic structural diagram of a network device provided in embodiments of the present disclosure. As illustrated in FIG. 14, the network device 140 can include a transceiver 141, a memory 142, and a processor 143. The transceiver 141 may include a transmitter and/or a receiver. The transmitter may also be referred to as a transmitting port, a transmitting interface, or similar descriptions, and the receiver may also be referred to as a receiving port, a receiving interface, or similar descriptions. Exemplarily, the transceiver 141, the memory 142, and the processor 143 may be connected with each other via a bus 144. The memory 142 is configured to store program instructions. The processor 143 is configured to execute the program instructions stored in the memory, to cause the network device 140 to implement any of the communication methods. The receiver of the transceiver 141 can be configured to implement a receiving function of the network device in the communication methods.

A computer-readable storage medium is provided in embodiments of the present disclosure. The computer-readable storage medium is configured to store computer-executable instructions which, when executed by a processor, are operable to implement the communication methods.

A computer-readable storage medium is provided in embodiments of the present disclosure. The computer-readable storage medium is configured to store computer-executable instructions which, when executed by a processor, are operable to implement the communication methods.

A computer program product is provided in embodiments of the present disclosure. The computer program product may be executed by a processor. The computer program product, when executed by the processor, may implement any of the communication methods performed by a terminal device or a network device.

A communication device, a computer-readable storage medium, and a computer program product provided in embodiments of the present disclosure may implement any of the communication methods performed by a terminal device or a network device, and specific implementation process and beneficial effects thereof may be referred to the above, which will not be repeated herein.

It will be appreciated that the systems, apparatuses, and methods disclosed in embodiments of the present disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Units illustrated as separated components may or may not be physically separated. Components displayed as units may or may not be physical units, and may reside at one location or may be distributed to multiple networked units. Some or all of the units may be selectively adopted according to practical needs to achieve desired objectives of the solutions of embodiments of the present disclosure. In addition, various functional units described in various embodiments of the present disclosure may be integrated into one processing unit or may be present as a number of physically separated units, and two or more units may be integrated into one. The integrated unit may take the form of a hardware or a software functional unit.

Those of ordinary skill in the art can understand that, all or some of the steps of the method embodiments may be implemented by programs instructing related hardware. The programs may be stored in a computer-readable storage medium. When the programs are executed, the steps of the method embodiments are performed. The storage medium may be any medium capable of storing program codes, such as a read-only memory (ROM), a random-access memory (RAM), a magnetic disk, or an optical disk.

Finally, it may be noted that, the foregoing embodiments are merely intended for describing the technical solutions of the present disclosure, but are not intended to limit the present disclosure. Although the present disclosure is described in detail with reference to the foregoing embodiments, those of ordinary skill in the art may understand that modifications can still be made to the technical solutions described in the foregoing embodiments, or equivalent replacements can be made to some or all technical features. However, these modifications or replacements do not make the essence of the corresponding technical solutions depart from the scope of the technical solutions of the embodiments of the present disclosure.

What is claimed is:

1. A communication method, applicable to a terminal device and comprising:

receiving validity information of a network slice from a network device, wherein the validity information indicates whether the network slice is available for a packet data unit (PDU) session establishment request or a PDU session modification request, the validity information contains at least one of location information or time information, the location information indicates at least one of a valid area or an invalid area of the network slice, and the time information indicates at least one of a valid time period or an invalid time period of the network slice; and determining whether to transmit at least one of the PDU session establishment request or the PDU session modification request for the network slice according to at least one of the location information or the time information, the determining comprising at least one of:

determining whether the network slice is available for the PDU session establishment request or the PDU session modification request according to at least one of the location information or the time information;

initiating the PDU session establishment request or the PDU session modification request for the network slice in a case where the network slice is available for the PDU session establishment request or the PDU session modification request; or skipping initiating the PDU session establishment request or the PDU session modification request for the network slice in a case where the network slice is unavailable for the PDU session establishment request or the PDU session modification request.

2. The method of claim 1, wherein the location information contains at least one of location validity information indicating the valid area of the network slice or location invalidity information indicating the invalid area of the network slice; and the time information contains at least one of time validity information indicating the valid time period of the network slice or time invalidity information indicating the invalid time period of the network slice.

3. The method of claim 2, wherein the location validity information contains at least one of a first cell identifier or a first tracking area identifier (TAI); and the time validity information contains at least one of a first start time, a first duration, or a first stop time.

4. The method of claim 1, wherein the validity information is carried in any one of the following messages transmitted by the network device:

a first message, wherein the first message is a registration response message for a registration request message transmitted by the terminal device or a terminal configuration update message; or a second message.

5. The method of claim 1, wherein the network device is a core network device, and the core network device comprises an access and mobility management function (AMF).

6. A terminal device, comprising:

a transceiver;

a memory configured to store computer programs; and a processor configured to execute the computer programs to cause the terminal device to:

receive validity information of a network slice from a network device, wherein the validity information indicates whether the network slice is available for a packet data unit (PDU) session establishment request or a PDU session modification request, the validity information contains at least one of location information or time information, the location information indicates at least one of a valid area or an invalid area of the network slice, and the time information indicates at least one of a valid time period or an invalid time period of the network slice; and determine whether to transmit at least one of the PDU session establishment request or the PDU session modification request for the network slice according to at least one of the location information or the time information;

wherein the processor is configured to cause the terminal device to perform at least one of:

determining whether the network slice is available for the PDU session establishment request or the PDU session modification request according to at least one of the location information or the time information;

initiating the PDU session establishment request or the PDU session modification request for the network slice in a case where the network slice is available for the PDU session establishment request or the PDU session modification request; or skipping initiating the PDU session establishment request or the PDU session modification request for the network slice in a case where the network slice is unavailable for the PDU session establishment request or the PDU session modification request.

7. The terminal device of claim 6, wherein the location information contains at least one of location validity information indicating the valid area of the network slice or location invalidity information indicating the invalid area of the network slice; and the time information contains at least one of time validity information indicating the valid time period of the network slice or time invalidity information indicating the invalid time period of the network slice.

8. The terminal device of claim 7, wherein the location validity information contains at least one of a first cell identifier or a first tracking area identifier (TAI); and the time validity information contains at least one of a first start time, a first duration, or a first stop time.

9. The terminal device of claim 6, wherein the validity information is carried in any one of the following messages transmitted by the network device:

a first message, wherein the first message is a registration response message for a registration request message transmitted by the terminal device or a terminal configuration update message; or a second message.

10. A network device, comprising:

a transceiver;

a memory configured to store computer programs; and a processor configured to execute the computer programs to cause the network device to:

transmit validity information of a network slice to a terminal device, wherein the validity information indicates whether the network slice is available for a packet data unit (PDU) session establishment request or a PDU session modification request;

wherein the validity information contains at least one of location information or time information, the location information indicates at least one of a valid area or an invalid area of the network slice, and the time information indicates at least one of a valid time period or an invalid time period of the network slice;

wherein at least one of the location information or the time information is used for the terminal device to determine whether to transmit at least one of the PDU session establishment request or the PDU session modification request for the network slice, the determining comprising at least one of:

determining whether the network slice is available for the PDU session establishment request or the PDU session modification request according to at least one of the location information or the time information;

initiating the PDU session establishment request or the PDU session modification request for the network slice in a case where the network slice is available for the PDU session establishment request or the PDU session modification request; or skipping initiating the PDU session establishment request or the PDU session modification request for the network slice in a case where the network slice is unavailable for the PDU session establishment request or the PDU session modification request.

11. The network device of claim 10, wherein the location information contains at least one of location validity information indicating the valid area of the network slice or location invalidity information indicating the invalid area of the network slice; and the time information contains at least one of time validity information indicating the valid time period of the network slice or time invalidity information indicating the invalid time period of the network slice.

12. The network device of claim 11, wherein the location validity information contains at least one of a first cell identifier or a first tracking area identifier (TAI); and the time validity information contains at least one of a first start time, a first duration, or a first stop time.

13. The network device of claim 10, wherein the network device is a core network device, and the core network device comprises an access and mobility management function (AMF).

* * * * *